(12) United States Patent
Phatak et al.

(10) Patent No.: US 12,129,434 B2
(45) Date of Patent: Oct. 29, 2024

(54) METHOD FOR BOOSTING VISCOSITY OF A FRACTURING FLUID

(71) Applicant: Stepan Company, Northbrook, IL (US)

(72) Inventors: Alhad Phatak, Sugar Land, TX (US); Yonglin Ren, Houston, TX (US); Brian Seymour-Loya, Houston, TX (US); Aaron Sanders, Houston, TX (US)

(73) Assignee: STEPAN COMPANY, Northbrook, IL (US)

( * ) Notice: Subject to any disclaimer, the term of this patent is extended or adjusted under 35 U.S.C. 154(b) by 0 days.

(21) Appl. No.: 18/018,139

(22) PCT Filed: Jun. 24, 2021

(86) PCT No.: PCT/US2021/038862
§ 371 (c)(1),
(2) Date: Jan. 26, 2023

(87) PCT Pub. No.: WO2022/026090
PCT Pub. Date: Feb. 3, 2022

(65) Prior Publication Data
US 2023/0272267 A1    Aug. 31, 2023

Related U.S. Application Data

(60) Provisional application No. 63/057,048, filed on Jul. 27, 2020.

(51) Int. Cl.
*C09K 8/80* (2006.01)
(52) U.S. Cl.
CPC ............ *C09K 8/80* (2013.01); *C09K 2208/28* (2013.01)

(58) Field of Classification Search
None
See application file for complete search history.

(56) References Cited

U.S. PATENT DOCUMENTS

| 5,067,508 A | 11/1991 | Lee et al. |
| 6,776,235 B1 | 8/2004 | England |

(Continued)

FOREIGN PATENT DOCUMENTS

| EP | 3556823 A1 | 10/2019 |
| WO | 2015175627 A1 | 5/2015 |

(Continued)

OTHER PUBLICATIONS

International Search Report issued in International Application No. PCT/US2021/038862, Nov. 5, 2021, 4 pages.

*Primary Examiner* — Andrew Sue-Ako
(74) *Attorney, Agent, or Firm* — DILWORTH IP, LLC

(57) ABSTRACT

A hydraulic fracturing method is disclosed. A small proportion of a nonionic surfactant is used in combination with an acrylamide polymer emulsion friction reducer, the proppant, and the base water to boost the viscosity of the fracturing fluid. The nonionic surfactant has a calculated HLB within the range of 10 to 17. The nonionic surfactants include selected aralkylated phenol ethoxylates, amine or amidoamine ethoxylates, mixed EO/PO alcohol alkoxylates, ethoxylated alcohols, ethoxylated amides, and alkylphenol ethoxylates. The nonionic surfactant boosts the viscosity of the fracturing fluid, promotes proppant transfer, and enables more-efficient hydrocarbon production.

18 Claims, 9 Drawing Sheets

(56) References Cited

U.S. PATENT DOCUMENTS

| | | |
|---|---|---|
| 7,579,302 B2 | 8/2009 | McMechan et al. |
| 7,621,335 B2 | 11/2009 | Valeriano et al. |
| 9,315,722 B1 | 4/2016 | Jackson et al. |
| 9,365,764 B2 | 6/2016 | Bobier et al. |
| 9,670,398 B2 | 6/2017 | Wang et al. |
| 9,708,562 B2 | 7/2017 | Soane et al. |
| 2013/0153234 A1* | 6/2013 | Bobier .................. C09K 8/602 |
| | | 507/225 |
| 2017/0096597 A1 | 4/2017 | Hu et al. |
| 2020/0190397 A1* | 6/2020 | Seymour-Loya ........ C09K 8/68 |
| 2020/0190399 A1* | 6/2020 | Xu ........................ E21B 43/267 |
| 2021/0261855 A1* | 8/2021 | Xu ........................... C09K 8/68 |

FOREIGN PATENT DOCUMENTS

| | | | | |
|---|---|---|---|---|
| WO | 2019046198 A1 | | 3/2019 | |
| WO | WO 2019/099022 | * | 5/2019 | .............. C09K 8/60 |
| WO | WO 2020/081095 | * | 4/2020 | .............. C09K 8/68 |

\* cited by examiner

METHOD FOR BOOSTING VISCOSITY OF A FRACTURING FLUID

FIELD OF THE INVENTION

The invention relates to hydraulic fracturing fluids and a method for maintaining adequately high viscosity of the fluids under high-salinity conditions.

BACKGROUND OF THE INVENTION

Hydraulic fracturing is used to stimulate the production of oil and gas from a portion of a subterranean formation or reservoir. Fresh water, recycled water, produced water from a formation, or some combination thereof is injected into the formation at high flow rates to create or enhance fractures in the formation. "Proppants" such as silicas are included to keep fractures open well enough to allow oil, gas, and produced water to be recovered.

Injecting water at high rates creates friction. To reduce the energy and horsepower requirements for hydraulic fracturing by as much as 80%, friction reducers ("FR") are added to the injected water, and such processes are known as "slickwater fracturing." Acrylamide polymers such as partially hydrolyzed polyacrylamide ("HPAM") are well known friction reducers for slickwater fracturing.

Friction reducers can be combined with surfactants to boost their ability to reduce friction. Previously (see WO 2019/046198), we described combinations of acrylamide polymer emulsions with certain nonionic surfactants that enhance friction reduction when used at low concentrations, so-called "friction reducer boosters."

Fresh water was once readily available for slickwater fracturing, but operators now frequently rely more heavily on recycled and produced water and require fracturing fluids that tolerate its high salinity. Unfortunately, the high concentration of monovalent and divalent cations in the brines or produced water commonly used for hydraulic fracturing can adversely affect the performance of traditional friction reducers. To overcome the problem of reduced effectiveness of friction reducers with produced water, salt-tolerant friction reducer systems have been developed, but these compositions are more expensive than traditional anionic HPAM friction reducers.

In addition to diminished friction reduction capability, high salinity can prevent the friction reducer from boosting viscosity in a desirable way. Hydraulic fracturing treatments that utilize the viscosity generated by friction reducers are termed "high-viscosity friction reducer" or "HVFR" treatments in the industry. An adequately high viscosity is needed to promote proppant transport within the formation.

While slickwater fracturing fluids employ friction reducers at concentrations of 1,000 ppm or lower (or 1 gallon per thousand gallons, i.e., 1 "gpt" or lower), higher concentrations in the range of 2,000 ppm (or 2 gallons per thousand gallons, i.e., 2 gpt) to 8,000 ppm (or 8 gallons per thousand gallons, i.e., 8 gpt) are employed to achieve desirable viscosities in HVFR treatments. To counteract viscosity reductions due to high salinity, operators would have to resort to even more elevated levels of friction reducers. This multiplies the cost of friction reducer by up to an order of magnitude and results in a greater likelihood of permeability reduction in the reservoir from the friction reducer.

To complicate matters further, the hydraulic fracturing liquid needs to generate viscosity rapidly upon combination of the friction reducer composition (including any FR booster) with the produced water. Additionally, because the mixing is performed "on the fly" in the field, rapid decisions regarding adjustment of FR concentrations are needed.

Operators of hydraulic fracturing processes would benefit from the availability of fluids that would rapidly promote or maintain desirably high viscosities under the increasingly common high-salinity conditions. Desirable fluids would include cost-effective components that are commercially available or can be easily synthesized. Ideally, the amount of friction reducer would not need to be increased by two- to ten-fold to achieve an acceptable viscosity for effective proppant transport.

SUMMARY OF THE INVENTION

Figure 1:
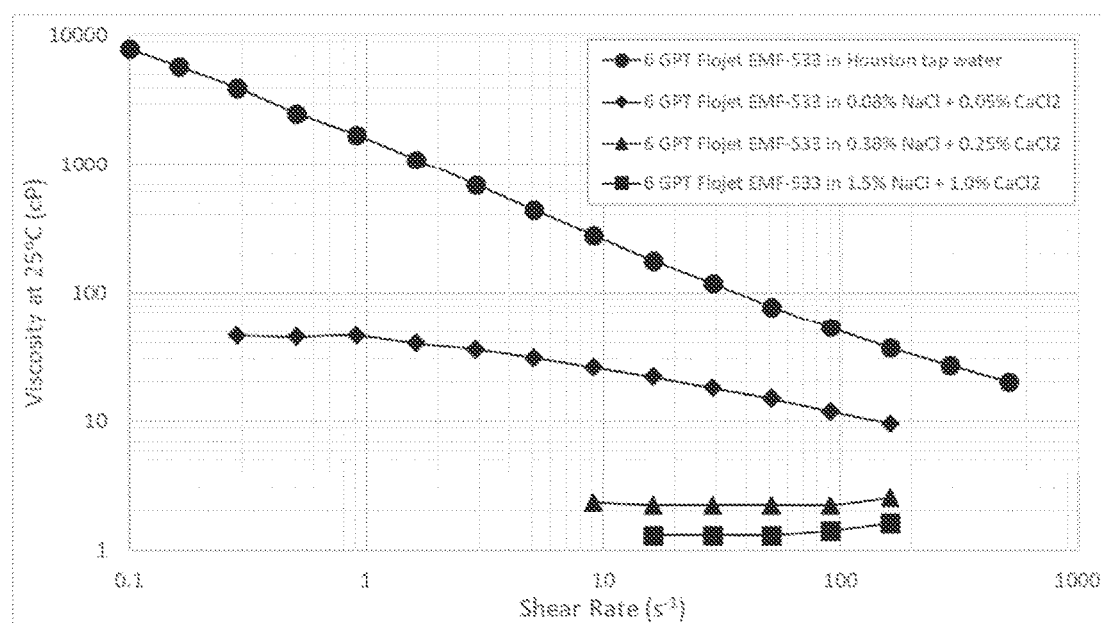
FIG. 1 shows the effect of increasing salinity on viscosity for FLOJET® EMF-533, an anionic friction reducer, with viscosity plotted versus shear rate.

In one aspect, the invention relates to a hydraulic fracturing method in which a small proportion of a nonionic surfactant is used in combination with an acrylamide polymer emulsion friction reducer to boost the viscosity of a fracturing fluid and enable better proppant transport, especially when produced water is used.

The method comprises recovering hydrocarbons using a proppant and a fracturing fluid that comprises: (i) a base water comprising produced water, recycled water, fresh water, or a combination thereof; (ii) an acrylamide polymer emulsion friction reducer; and (iii) a nonionic surfactant having a calculated HLB within the range of 10 to 17. The proppant is used at a concentration of 0.25 to 6 pounds per gallon of fracturing fluid. The friction reducer is used at a concentration of 1.5 to 15 gallons per thousand gallons of fracturing fluid, and the nonionic surfactant is used at a concentration of 1 to 20 parts by weight per 100 parts by weight of friction reducer. The nonionic surfactant is selected from the group consisting of: (a) aralkylated phenol ethoxylates; (b) $C_{12}$-$C_{22}$ amine ethoxylates or $C_{12\text{-}22}$ amidoamine ethoxylates; (c) alkoxylates of linear or branched $C_8$-$C_{18}$ alcohols, the alkoxylates having 10 to 90 mole % of oxyethylene units and 10 to 90 mole % of oxypropylene units, wherein the mole % values are based on the combined amounts of oxyethylene and oxypropylene units; (d) ethoxylated $C_9$-$C_{15}$ alcohols; (e) ethoxylated $C_8$-$C_{18}$ amides; and f) alkylphenol ethoxylates having a $C_8$-$C_{16}$ alkyl group and an average of 8 to 25 oxyethylene groups.

The nonionic surfactant enhances the viscosity of the fracturing fluid during use when compared with the same fracturing fluid used in the absence of the nonionic surfactant, thereby enabling more effective proppant transport and, consequently, more-efficient hydrocarbon production from the subterranean, fractured formation.

DETAILED DESCRIPTION OF THE INVENTION

In one aspect, the invention relates to a method comprising recovering hydrocarbons by hydraulic fracturing using a proppant and a fracturing fluid. Fracturing fluids used in the inventive method comprise: (i) a base water comprising recycled water, produced water, fresh water, or a combination thereof; (ii) an acrylamide polymer emulsion friction reducer; and (iii) a nonionic surfactant having a calculated HLB within the range of 10 to 17.

Base Water

As used herein, "base water" refers to recycled water, produced water, fresh water, or combinations thereof used for hydraulic fracturing. The base water can originate from various sources from fresh water to sources that have high TDS content, such as collection ponds of produced water. "Produced water" refers to water produced during recovery of hydrocarbons that contains an elevated content of monovalent and/or divalent ions when compared with fresh water. Produced water includes brines, which may occur naturally in a subterranean formation or may result when injected fresh or produced water contacts ion-rich minerals or brines within a formation. Produced water from a slickwater fracturing process is suitable for use. In some aspects, the monovalent cation content of the base water exceeds 10,000 ppm, 20,000 ppm, 50,000 ppm, 80,000 ppm, 100,000 ppm, or 300,000 ppm of total dissolved solids. In some aspects, the divalent cation content of the base water exceeds 500 ppm, 2,000 ppm, 10,000 ppm, or 20,000 ppm of total dissolved solids.

Proppant

Proppants are used for the hydraulic fracturing method. Suitable proppants are generally known in the art and include, for example, sands, treated sands, resin-coated sands, pre-cured resin-coated sands, synthetic ceramics, sintered bauxites, and the like, and combinations thereof.

The type, particle size distribution, and amount of proppant used depend on the is nature of the formation, availability and cost of materials, selection and concentration of the acrylamide polymer emulsion friction reducer, selection and concentration of the nonionic surfactant, horsepower ranges, and other factors. The proppant is used in an amount within the range of 0.25 and 6 pounds per gallon of fracturing fluid, or in some aspects, from 0.5 to 4, or from 1 to 3, pounds per gallon of fracturing fluid. Sands or treated sands are usually the most economical choice for an effective proppant. Usually, sands having a range of mesh sizes of interest are selected, and these generally have mesh sizes from 10 to 200, and especially from 10 to 100. For instance, depending on the factors noted above, sand having mesh sizes 12/20, 20/40, 30/50, 40/70 might be selected.

Acrylamide Polymer Emulsion

Acrylamide polymers suitable for use are in the form of an emulsion, usually a water-in-oil emulsion, i.e., one having a continuous hydrocarbon phase and a discontinuous aqueous phase. The aqueous phase comprises an acrylamide polymer, which can be anionic or cationic. In some preferred aspects, the acrylamide polymer is anionic. A water-in-oil emulsion can be a desirable way to introduce a friction reducer into a hydraulic fracturing process. The active components are maintained in tiny emulsified droplets until the emulsion is contacted with a relatively large volume of water. The emulsion then inverts and releases the water-soluble acrylamide polymer into the base water or brine. The oil phase of the water-in-oil emulsion is desirably a liquid hydrocarbon, typically xylene, toluene, mineral oils, kerosenes, naphthas, or the like. The products are supplied for use as friction reducers in oilfield applications. Suitable acrylamide polymers are available from SNF Floerger, Schlumberger, BASF, Haliburton, Rockwater Energy Solutions, and other suppliers. Examples include SNF products sold under the FLOJET® or FLOPAM™ marks, e.g., FLOJET® EMF-533 (or FLOPAM™ EMF-533) and PFR-902 anionic high viscosity acrylamide emulsions and FR-3000 and FR-5000 anionic acrylamide emulsions, products of SNF Floerger. Suitable cationic acrylamide emulsions include FLOPAM™ EM 240 CT from SNF Floerger.

The acrylamide polymers present in these emulsions comprise recurring units of acrylamide and may include recurring units of other ethylenic monomers such as is (meth)acrylic acid, (meth)acrylate esters, vinyl esters, vinyl sulfonic acids, and the like. Partially hydrolyzed polyacrylamides are readily available and are preferred because of their relatively low cost. Salt-tolerant acrylamide polymers can also be used, but they are typically more expensive.

Acrylamide polymers are generally made by polymerizing acrylamide with or without suitable comonomers, typically in the presence of a free-radical initiator, to prepare essentially linear acrylamide polymers. Acrylamide polymers are usually water soluble. Polyacrylamides can often be used as obtained after polymerization. Preferably, however, the polyacrylamide is partially hydrolyzed by reacting it with a base, such as sodium hydroxide, to convert a portion of the amide groups to carboxylic acid groups. Hydrolysis of an acrylamide recurring unit essentially generates an acrylic acid recurring unit. Partially hydrolyzed polyacrylamide is often referred to as "HPAM." The carboxylate groups present in HPAM make this kind of acrylamide polymer emulsion anionic in nature, and anionic acrylamide polymer emulsions are generally preferred.

The acrylamide polymers usually have relatively high molecular weights. For instance, in some aspects, the acrylamide polymer will have a weight-average molecular weight, as determined by an intrinsic viscosity measurement, within the range of 1,000,000 to 30,000,000 g/mol, from 1,000,000 to 10,000,000 g/mol, or from 1,000,000 to 5,000,000 g/mol.

Other suitable acrylamide polymer emulsions have been described elsewhere. See, e.g., U.S. Publ. No. 2017/0096597 at paragraphs [0069]-[0107], and U.S. Pat. No. 9,315,722 ("Friction Reducing Polymers," cols. 3-4), the teachings of which are incorporated herein by reference.

In some aspects, the nonionic surfactants described below are incorporated into the emulsion containing the acrylamide polymer. We found that these surfactants can often be incorporated into the emulsions without destabilizing them. The aqueous phase of the acrylamide polymer emulsions usually makes up 30 to 95 wt. % of the emulsion, although the proportion of water will be much lower in a "dewatered" emulsion. The aqueous phase includes water and the acrylamide polymer and may include some or all of the nonionic surfactant. The acrylamide polymer typically makes up 10 to 50 wt. % or 25 to 40 wt. % of the emulsion (or higher proportions in dewatered emulsions). The oil phase is typically 5 to 70 wt. % or 20 to 35 wt. % of the emulsion (or higher proportions in dewatered emulsions). In some aspects, the nonionic surfactant is included at 0.1 to 10 wt. %, 0.5 to 5 wt. %, or 1 to 4 wt. % based on the amount of acrylamide polymer emulsion.

The acrylamide polymer emulsion may include small proportions of other components, including, for instance, one or more emulsifiers, inverting surfactants, salts, inhibitors, and the like, as is discussed in U.S. Pat. Nos. 5,067,508; 9,315,722; and 9,708,562, the teachings of which are incorporated herein by reference. Suitable emulsifiers are well known. Examples include sorbitan esters (sorbitan monostearate, sorbitan monooleate, and the like), alcohol ethoxylates, fatty acid alkanolamides, and the like.

The amount of acrylamide polymer emulsion friction reducer used is within the range of 2 to 15 gallons per thousand gallons (gpt), typically from 2 to 10 gpt or from 2 to 8 gpt, based on the amount of fracturing fluid used in the hydraulic fracturing process. Use levels of 2 to 8 gpt correspond to the range of 2000 to 8000 ppm. These levels are at least about double the amount of friction reducer commonly used for slickwater fracturing. The industry refers to use of acrylic polymer emulsions at this level as "high-viscosity" friction reducers, although the same compositions are used at lower concentrations for traditional slickwater fracturing.

Nonionic Surfactant

Nonionic surfactants suitable for use have calculated HLB values within the range of 10 to 17. "Calculated HLB value" as used herein refers to the HLB calculated from:

$$HLB=(20 \times Mh)/M$$

where Mh is the average molar mass of the hydrophilic portion of the molecule, and M is the average molar mass of the entire molecule. HLB values for commercially available nonionic surfactants are often provided on the supplier's technical datasheet.

Suitable nonionic surfactants include: (i) aralkylated phenol ethoxylates; (ii) $C_{12}$-$C_{22}$ amine ethoxylates or $C_{12-22}$ amidoamine ethoxylates; (iii) alkoxylates of linear or branched $C_8$-$C_{18}$ alcohols, the alkoxylates having 10 to 90 mole % of oxyethylene units and 10 to 90 mole % of oxypropylene units, wherein the mole % values are based on the combined amounts of oxyethylene and oxypropylene units; (iv) ethoxylated $C_9$-$C_{15}$ alcohols; (v) ethoxylated $C_8$-$C_{18}$ amides; and (vi) alkylphenol ethoxylates having a $C_8$-$C_{16}$ alkyl group and an average of 8 to 25 oxyethylene groups.

The nonionic surfactant is generally used in an amount within the range of 1 to 20 parts by weight per 100 parts by weight of friction reducer ("1 to 20 pph"). In some aspects, the amount used is 2 to 10 pph or 2 to 8 pph. This generally corresponds to 0.015 to 3 gallons per thousand gallons ("gpt") of fracturing fluid (15 to 3000 ppm), or from 0.03 to 1 gpt (30 to 1000 ppm), or from 0.1 to 0.8 gpt (100 ppm to 800 ppm). For example, the 0.6 gpt level in the examples provided below can also be expressed as "600 ppm."

The nonionic surfactant enhances (increases) the viscosity of the fracturing fluid compared with that of the same fracturing fluid used in the absence of the nonionic surfactant. This benefit allows maintenance of a sufficiently high viscosity to promote proppant transport even when using produced waters having high salinities, especially 10,000 ppm TDS or more. In some aspects, the nonionic surfactant also boosts friction reduction when compared with the friction reduction achieved in the absence of the nonionic surfactant.

1. Aralkylated Phenol Ethoxylates

Figure 4:
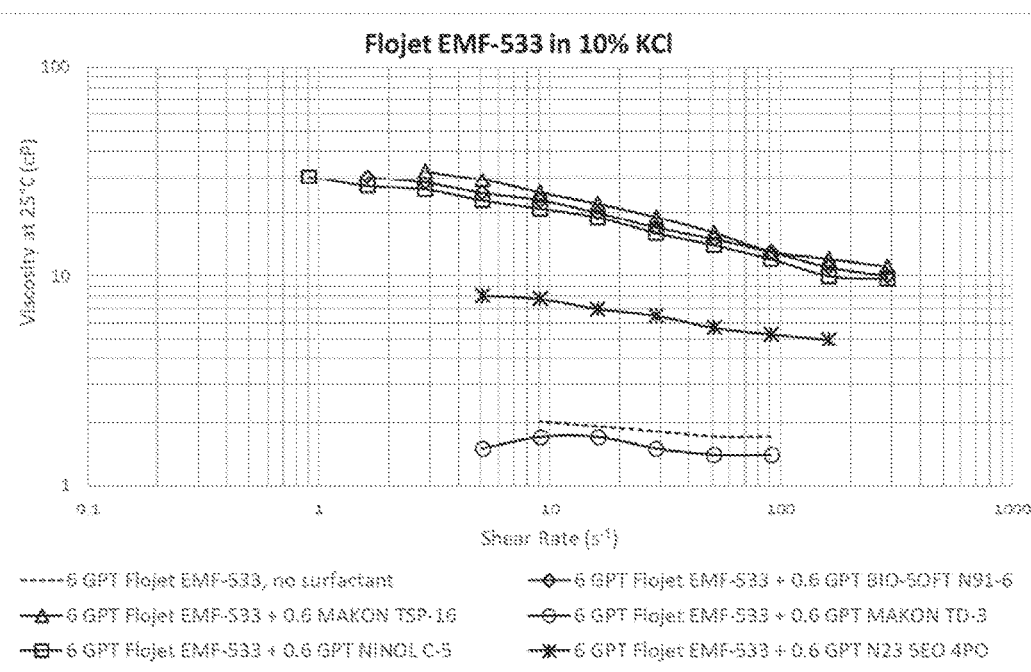
FIG. 4 shows that various surfactant classes can enable anionic friction reducers to maintain high viscosity under high-salinity conditions, with MAKON® TD-3 (HLB=8) being the exception in this series.

In some aspects, the nonionic surfactant is an aralkylated phenol ethoxylate. Suitable aralkylated phenol ethoxylates can be made by aralkylating a phenol with a vinyl aromatic monomer, preferably styrene, followed by ethoxylation of the phenolic hydroxyl group with a desired number of ethylene oxide equivalents. The aralkylated phenols have one, two, or three aralkyl groups. Thus, mono-, di-, and tristyrylphenols are suitable for use, as are mixtures of these. Many aralkylated phenols are supplied as mixtures of two or more different aralkylated phenols. For instance, tristyrylphenol as supplied typically contains a significant proportion of distyrylphenol. Tristyrylphenol ethoxylates, especially those having an average of 12 to 25 EO recurring units, or from 16 to 25 EO recurring units, are preferred. In some aspects, the aralkylated phenol ethoxylates have a calculated HLB value within the range of 12 to 16, or from 12 to 14. Suitable aralkylated phenol ethoxylates are available commercially from Stepan Company under the MAKON® mark, or from other suppliers. Examples include MAKON® TSP-12 (HLB=12), MAKON® TSP-16 (HLB=13), MAKON® TSP-20 (HLB=14), MAKON® TSP-25 (HLB=15), MAKON® TSP-25F (HLB=14), MAKON® TSP-40N (HLB=16), MAKON® TSP-40F (HLB=15), which have an average of 12, 16, 20, 25, 25, 40, or 40 oxyethylene units, respectively. FIG. 4 illustrates the use of MAKON® TSP-16 as a nonionic surfactant.

2. Amine Ethoxylates and Amidoamine Ethoxylates

Suitable nonionic surfactants include $C_{12}$-$C_{22}$ amine ethoxylates or $C_{12}$-$C_{22}$ amidoamine ethoxylates having calculated HLB values from 10 to 17. These surfactants ultimately derive from $C_{12}$-$C_{22}$ fatty acids, which can be saturated (e.g., coconut fatty acid, lauric acid, myristic acid, palmitic acid, stearic acid), monounsaturated (e.g., oleic acid, palmitoleic acid), or polyunsaturated (e.g., linoleic acid, linolenic acid). The amine ethoxylates or amidoamine ethoxylates can have, for example, 6 to 40 oxyethylene (EO) units or 8 to 20 EO units.

Figure 3:
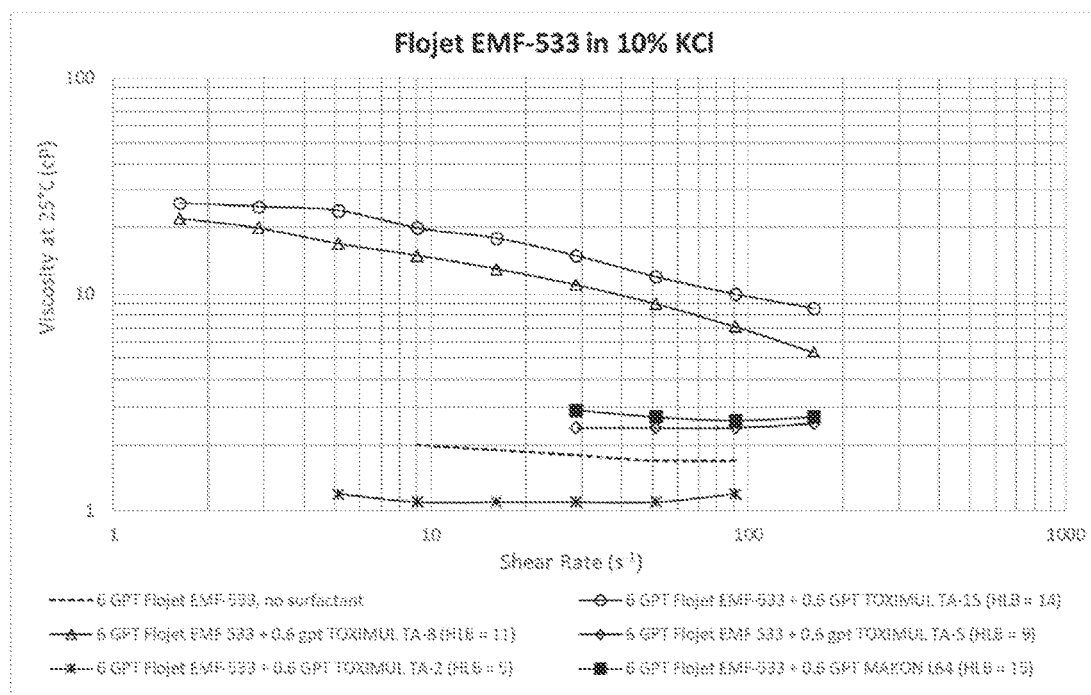
FIG. 3 shows that for a series of tallowamine ethoxylates, those with higher HLB are more effective in achieving high enough viscosity with the anionic friction reducer. However, the figure also shows that high HLB alone is insufficient to impart higher viscosity, as MAKON® L64, an EO-PO-EO block copolymer (HLB=15) and a known friction reducer booster, fails to maintain high viscosity in 10% KCl.

A preferred class of amine ethoxylates are tallowamine ethoxylates. Tallowamine ethoxylates are generally produced in multiple steps from tallow (animal fat). In a first step, the animal fat is hydrolyzed to produce a mixture of fatty acids, primarily oleic acid ($C_{18}$, monounsaturated), palmitic acid ($C_{16}$, saturated), and stearic acid ($C_{18}$, saturated). The fatty acid mixture is reacted with ammonia at high temperature in the presence of a metal oxide catalyst to give a mixture of fatty nitriles. Hydrogenation of this mixture provides a corresponding mixture of fatty amines. The fatty amines are then reacted with a desired number of ethylene oxide equivalents to give tallowamine ethoxylates. In one aspect, the tallowamine ethoxylate has an average of 8 to 20 EO recurring units. FIG. 3 demonstrates a desirable increase in viscosity when TOXIMUL® TA-8 (HLB=11) or TOXIMUL® TA-15 (HLB=14) is used as the nonionic surfactant.

Commercially available amine ethoxylates include cocamine ethoxylates and tallowamine ethoxylates available from Stepan under the TOXIMUL® mark, including, for example, TOXIMUL® TA-8, TOXIMUL® TA-10, TOXIMUL® TA-15, TOXIMUL® CA-7.5, TOXIMUL® CA-15, and TOXIMUL® TA-20, which have an average of 8, 10, 15, 7.5, 15, or 20 oxyethylene units, respectively.

Amidoamine ethoxylates are usually produced in two steps starting with a reaction of the corresponding fatty acid or fatty ester with a polyamine such as diethylenetriamine ("DETA") or an aminoalcohol such as 2-aminoethyl ethanolamine ("AEEA") to produce an "amidoamine," i.e., an amide having amine functionality. When DETA is used, for example, the resulting amide will have both primary and secondary amine groups (in addition to the amide functionality). When AEEA is used, the resulting amide will have hydroxyl and secondary amine groups. In the second reaction step, active hydrogen groups (amino groups or both amino and hydroxyl groups) of the amidoamine react with ethylene oxide to give the amidoamine ethoxylate.

Thus, suitable amidoamine ethoxylates can be produced by reacting commercially available methyl esters or methyl ester mixtures with AEEA or DETA followed by an ethoxylation step, preferably with 6 to 20 or 8 to 14 EO equivalents. Suitable methyl ester starting materials for making the amidoamines include $C_8$-$C_{18}$ methyl ester mixtures, for instance, STEPAN® C-25, STEPAN® C-42, STEPAN® C-48, STEPAN® C-49, and STEPAN® C-65 from Stepan Company.

In some aspects, the $C_{12}$-$C_{22}$ amine ethoxylates or $C_{12}$-$C_{22}$ amidoamine ethoxylates have a calculated HLB value within the range of 11 to 17, preferably from 11 to 15.

3. Alkoxylates of Linear or Branched $C_8$-$C_{18}$ Alcohols

Suitable nonionic surfactants include alkoxylates of linear or branched $C_8$-$C_{18}$ alcohols. In particular, these alkoxylates have 10 to 90 mole % of oxyethylene (EO) units and 10 to 90 mole % of oxypropylene (PO) units. The mole % values are based on the combined amounts of oxyethylene and oxypropylene units. The EO and PO units can be introduced in blocks or randomly.

These alkoxylates are conveniently made by reacting a $C_8$-$C_{18}$ linear or branched alcohol with EO, PO, or a combination thereof in the presence of a catalyst, commonly a base catalyst such as potassium hydroxide. In a preferred approach, ethylene oxide units are introduced first, followed by propylene oxide units, to give a block copolymer having secondary hydroxyl groups.

In preferred aspects, the alkoxylates have 20 to 80 mole %, or 30 to 70 mole %, of oxyethylene units and 20 to 80 mole %, or 30 to 70 mole %, of oxypropylene units. In a preferred aspect, the alkoxylates have an internal EO block and an external PO block. In yet other aspects, the alkoxylates are produced from linear or branched $C_{12}$-$C_{14}$ alcohols. Examples include $C_{11}$-$C_{14}$ linear or branched alcohols having a block of 4 to 15 EO units and 2 to 10 PO units.

4. Ethoxylated Alcohols

Suitable ethoxylated alcohols are ethoxylated $C_9$-$C_{15}$ alcohols having a calculated HLB value within the range of 10 to 17, or in some aspects, from 11 to 15 or from 12 to 14. The alcohols can be linear or branched, primary or secondary.

The ethoxylated alcohols can be made by reacting a $C_9$-$C_{15}$ alcohol, or in some aspects, a $C_9$-$C_{11}$ alcohol, with 4 to 6 molar equivalents, or 5 to 6 molar equivalents, of ethylene oxide in the presence of a catalyst, typically a base catalyst.

Commercially available ethoxylated alcohols include, e.g., BIO-SOFT® N91-6 ($C_9$-$C_{11}$ alcohol 6 EO ethoxylate, HLB=12.4), BIO-SOFT® N1-7 ($C_{11}$ alcohol 7 EO ethoxylate, HLB=12.9), BIO-SOFT® N91-8 ($C_9$-$C_{11}$ alcohol 8 EO ethoxylate, HLB=13.9), BIO-SOFT® N23-6.5 ($C_{12}$-$C_{13}$ alcohol 6.5 EO ethoxylate, HLB=11.9), BIO-SOFT® E-678 ($C_{12}$-$C_{15}$ alcohol 9 EO ethoxylate, HLB=13.3), BIO-SOFT® EC-600 ($C_{12}$-$C_{14}$ alcohol 7 EO ethoxylate, HLB=12.2), BIO-SOFT® EC-639 ($C_{12}$-$C_{14}$ alcohol 8 EO ethoxylate, HLB=13.3), MAKON® DA-6 ($C_{10}$ alcohol 6 EO ethoxylate, HLB=12), MAKON® DA-9 ($C_{10}$ alcohol 9 EO ethoxylate, HLB=14), MAKON® TD-6 ($C_{13}$ alcohol 6 EO ethoxylate, HLB=11), MAKON® TD-9 ($C_{13}$ alcohol 9 EO ethoxylate, HLB=13.1), products of Stepan Company.

5. Ethoxylated $C_8$-$C_{18}$ Amides

Suitable ethoxylated $C_8$-$C_{18}$ amides have calculated HLB values from 10 to 17, or in some aspects, from 11 to 16 or from 12 to 15. They are usually made from the corresponding fatty acid or fatty ester, especially the methyl ester, by reacting them with an alkanolamine (e.g., ethanolamine or diethanolamine) followed by reaction of the resulting N-(hydroxyalkyl) fatty amide or N,N-bis(hydroxyalkyl) fatty amide with enough ethylene oxide to give an amide ethoxylate having the desired HLB level, preferably 6 to 20 or 8 to 14 EO equivalents. Suitable methyl ester starting materials for making the ethoxylated $C_8$-$C_{18}$ amides include $C_8$-$C_{18}$ methyl ester mixtures, for instance, STEPAN® C-25, STEPAN® C-42, STEPAN® C-48, STEPAN® C-49, and STEPAN® C-65 from Stepan Company.

Commercially available amide ethoxylates include NINOL® C-5 (HLB=14.6) and NINOL® 1301 (HLB=12.8), each of which is made from ethanolamine and 6 moles of EO per mole of a fatty methyl ester.

6. Alkylphenol Ethoxylates

Suitable nonionic surfactants include alkylphenol ethoxylates having a $C_8$-$C_{16}$ alkyl group and an average of 8 to 25 oxyethylene groups, especially 6 to 14 oxyethylene groups. The alkylphenol ethoxylates have calculated HLB values from 10 to 17, or from 11 to 15. They are usually made by ethoxylating the corresponding alkylphenols with enough ethylene oxide to reach a targeted HLB value. Nonylphenol ethoxylates and octylphenol ethoxylates are commercially available. Examples include MAKON® 6, MAKON® 8, MAKON® 10, MAKON® 12, MAKON® 14, MAKON® OP-9 and MAKON® OP-12, products of Stepan Company.

Figure 5A:
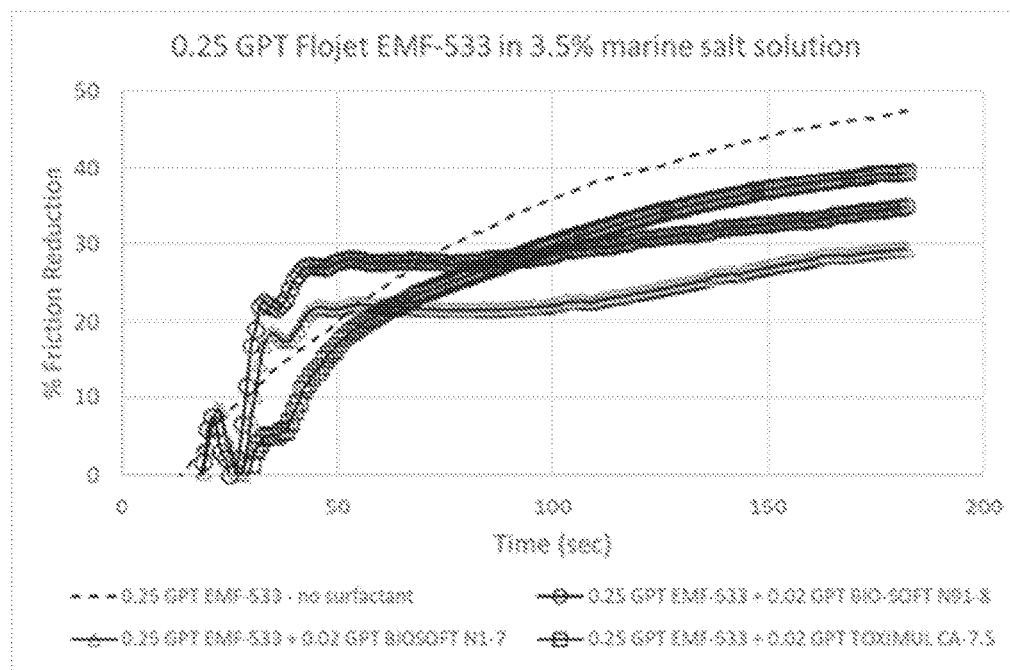
FIGS. 5A and 5B show a series of surfactants that fail to adequately boost friction reduction when used with an anionic friction reducer (FIG. 5A). However, the same surfactants do effectively augment viscosity (FIG. 5B). This shows that a surfactant that helps to maintain high viscosity will not necessarily also boost friction reduction; the properties are decoupled.
Figure 5B:
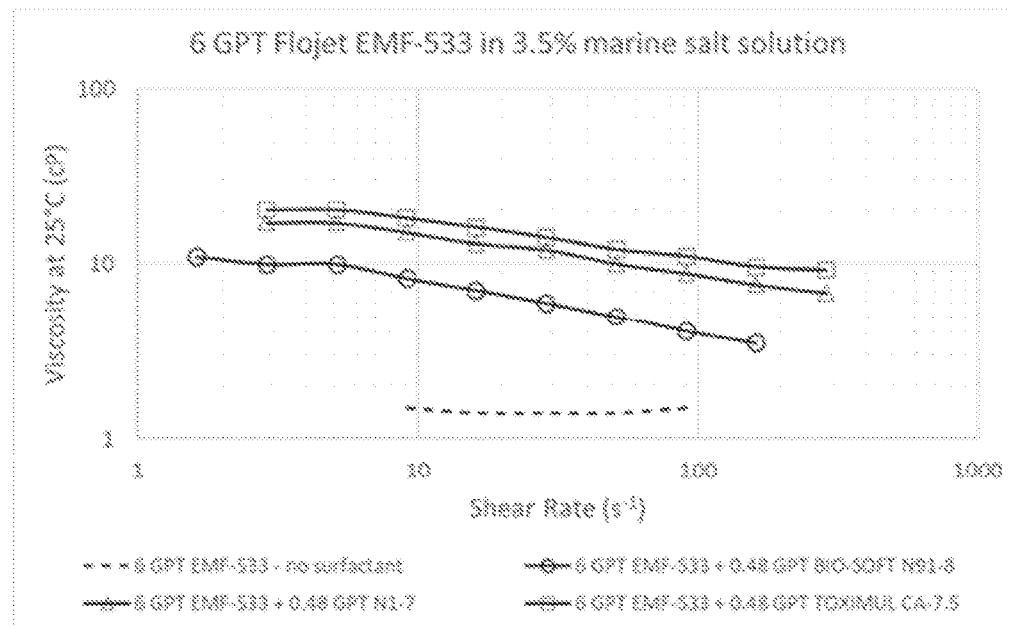

The nonionic surfactants identified above are generally effective in augmenting viscosity desirably under high-salinity conditions. Many are also effective in reducing friction. However, some were found to be marginally effective or ineffective as friction reducer boosters under the conditions used in our experiments. Consequently, some trial and error may be needed to confirm that a particular nonionic surfactant can satisfy the requirement of augmenting viscosity while also having the desirable attribute (if desired) of boosting friction reduction when used under the hydraulic fracturing operator's particular set of conditions. For instance, as shown in FIGS. 5A and 5B, we found that BIO-SOFT® N1-7, BIO-SOFT® N91-8, and TOXIMUL® CA-7.5 provide a desirable boost in viscosity when FLO-JET® EMF-533 is used at 6 gpt in the presence of marine salt solution, but these surfactants were generally ineffective in boosting friction reduction under the stressed test conditions of our experiment (0.25 gpt of friction reducer).

Hydraulic Fracturing

The invention includes hydraulic fracturing processes for recovering oil using acrylamide polymer-based friction reducers, including slickwater fracturing processes. Slickwater fracturing is generally known and is described in U.S. Publ. No. 2017/0096597 and U.S. Pat. Nos. 6,776,235; 7,579,302; 7,621,335; 9,365,764; and 9,670,398, the teachings of which are incorporated by reference.

Compositions used in the inventive hydraulic fracturing process may include (in addition to the base water, proppant, acrylamide polymer friction reducer, and the nonionic surfactant) other additives such as auxiliary surfactants, scale inhibitors, corrosion inhibitors, biocides, and the like.

The nonionic surfactant is used in an amount effective to boost the viscosity of the fracturing fluid (combination of base water, friction reducer, and nonionic surfactant) used in a hydraulic fracturing process. Inclusion of the nonionic surfactant increases viscosity and enables more effective proppant transport and, consequently, more-efficient hydrocarbon production from the subterranean, fractured formation.

Previously, we described the use of nonionic surfactants to boost the friction reducing capability of an acrylamide polymer in a slickwater fracturing process. In slickwater fracturing, the friction reducer is typically used at much lower concentration, typically 1000 ppm instead of 2000 to 8000 ppm. When the concentration of friction reducer is higher, as in the present inventive method, friction reduction is less of an issue and maintaining adequately high viscosity is more leveraging. Nevertheless, in some aspects, the nonionic surfactant provides the added benefit of also reducing friction when compared with the friction reduction achieved in the absence of the nonionic surfactant.

The nonionic surfactant can be added with the acrylamide polymer emulsion in one package or it can be introduced independently as a separate stream from the friction reducer. If the surfactant is mixed with the FR emulsion, it may additionally contain an organic solvent. The surfactant may be pre-mixed with other hydraulic fracturing additives such as scale inhibitors or flowback surfactants. In some aspects, it may be desirable to introduce the nonionic surfactant concurrently, or substantially concurrently, with the addition of the acrylamide polymer emulsion. In other aspects, the nonionic surfactant is introduced into the base water in advance, and the acrylamide polymer emulsion is added to the base water/nonionic surfactant mixture.

The inventive compositions and processes will be of considerable interest to oilfield service companies because of the ability to reduce their cost in providing fracturing service. A small proportion of the nonionic surfactant enables the use of less-expensive friction reducers such as partially hydrolyzed polyacrylamide emulsions even in high-salinity environments while providing performance of the more-expensive salt-tolerant polymers. This also allows the service provider to use less-diluted produced water, which is better for the environment. High viscosities needed for effective proppant transport can be achieved with the nonionic surfactants, even under high-salinity conditions.

Although hydraulic fracturing processes are of primary interest, the inventive compositions may have utility in other areas, particularly where acrylamide polymer emulsions are used to reduce turbulence in a conduit, and particularly where the aqueous stream has a high TDS content, including streams rich in multivalent cations. Other oilfield processes that may benefit from the inventive compositions include drilling, completion, wellbore cleanout, and other uses in midstream or downstream production.

The following examples merely illustrate the inventive subject matter, which is defined by the claims.

Friction Reducers (Products of SNF Floerger)

FLOJET® EMF-533, anionic polyacrylamide emulsion.
FLOPAM™ EM 240 CT, cationic polyacrylamide emulsion.

Surfactants (Products of Stepan Company Except as Otherwise Noted Below)

BIO-SOFT® N91-6, $C_9$-$C_{11}$ alcohol ethoxylate, HLB=12.4.
BIO-SOFT® N1-7, $C_{11}$ alcohol ethoxylate, HLB=12.9.
BIO-SOFT® N91-8, $C_9$-$C_{11}$ alcohol ethoxylate, HLB=13.9.
MAKON® TSP-16, tristyrylphenol ethoxylate, HLB=13.
MAKON® L64, EO-PO-EO block copolymer, HLB=15.
MAKON® TD-3, tridecyl alcohol ethoxylate, HLB=8.
NINOL® C-5, PEG-6 coconut DEA amide, HLB=14.6
N23 5E 4P, developmental EO/PO alkoxylate.
PETROSTEP® FRB-5, $C_{12}$-$C_{13}$ alcohol EO/PO copolymer.
PLURONIC® L64, EO-PO-EO block copolymer, HLB=15, product of BASF.
TOXIMUL® CA-7.5, cocamine ethoxylate, HLB=12.
TOXIMUL® TA-15, tallowamine ethoxylate, HLB=14.
TOXIMUL® TA-8, tallowamine ethoxylate, HLB=11.
TOXIMUL® TA-5, tallowamine ethoxylate, HLB=9.
TOXIMUL® TA-2, tallowamine ethoxylate, HLB=5.

Flow-Loop Experiments

The procedure of WO 2019/046198 is generally followed. Friction reduction is evaluated in flow-loop experiments using a Chandler Engineering model 6500 friction flow-loop system. The unit measures the change in differential pressure as the friction reducer is added into the system. It includes two 20' segments of ½" and ¾" outer diameter stainless-steel tubing, two 10' segments to measure differential pressure, and a progressive cavity pump for consistent flow in the 1-15 gallons per minute ("gpm") range.

Synthetic seawater contains about 400 ppm Ca and about 1200 ppm of Mg. For each test, 3-5 gallons of brine are prepared.

Brine is added directly into the fluid tub of the flow-loop system. Brine flows at a slow rate (2 gpm) until the flow loop is filled. The test begins at a flow rate of 8 gpm. Surfactant is either added directly into a water-in-oil emulsion of partially hydrolyzed polyacrylamide in hydrocarbon or is added into the tub immediately after starting the test. The flow loop runs for 2 min. before the polymer emulsion is added at a concentration of 0.25 gallons per thousand gallons (gpt) via an injection pump directly into the loop. The test runs for approximately 3 minutes, and the percent friction reduction (relative to water) is monitored and recorded as a function of time.

Viscosity Measurements

The appropriate brine is prepared by mixing salt with Houston tap water. A sample of the brine (50 mL) is added to a Waring blender cup. The friction reducer and surfactant (where applicable) are added to the brine while the Waring blender runs at 1000 rpm. After 30 seconds of mixing, fluid from the blender cup (22 mL) is added to a TA Rheometer DHR-3 cup. The rheometer spindle is lowered to the measurement position, and the viscosity measurement is started. Viscosities are measured at 25° C. and at shear rates within the range of 511 $s^{-1}$ and 0.1 $s^{-1}$.

The mixing time of only 30 seconds is used to account for the rapid viscosification required under conditions employed in the field, which typically involve "on-the-fly" mixing of friction reducer composition with produced water. When viscosity is too low for good proppant transport, operators accustomed to simply ramping up the concentration of friction reducer will have another "knob" to turn by including a small proportion of a surfactant that can augment viscosity of the aqueous mixture.

Example A: Effect of Salinity on Viscosity with Friction Reducer

The friction reducer is FLOJET® EMF-533 used at 6 gallons per thousand gallons (gpt). A baseline experiment is performed in Houston tap water in which viscosity versus shear rate is recorded. Salinity is increased in three similar subsequent experiments in which the salt concentrations are as follows: (1) 0.08 wt. % NaCl, 0.05 wt. % $CaCl_2$; (2) 0.08 wt. % NaCl, 0.05 wt. % $CaCl_2$; (3) 0.08 wt. % NaCl, 0.05 wt. % $CaCl_2$. Results appear in FIG. 1.

As shown in FIG. 1, even a low concentration of salt (see diamond shapes in FIG. 1) causes a significant drop in the viscosity generated using the anionic polyacrylamide friction reducer. As the concentration is increased further, the friction reducer has almost no viscosifying effect.

Example B: Effect of Surfactant Dose on Viscosity in 10% KCl

Given that salinity significantly reduces viscosity with the anionic friction reducer, experiments are performed to understand whether combining the friction reducer with a small proportion of various surfactants can help to avoid or minimize viscosity loss.

Figure 2:
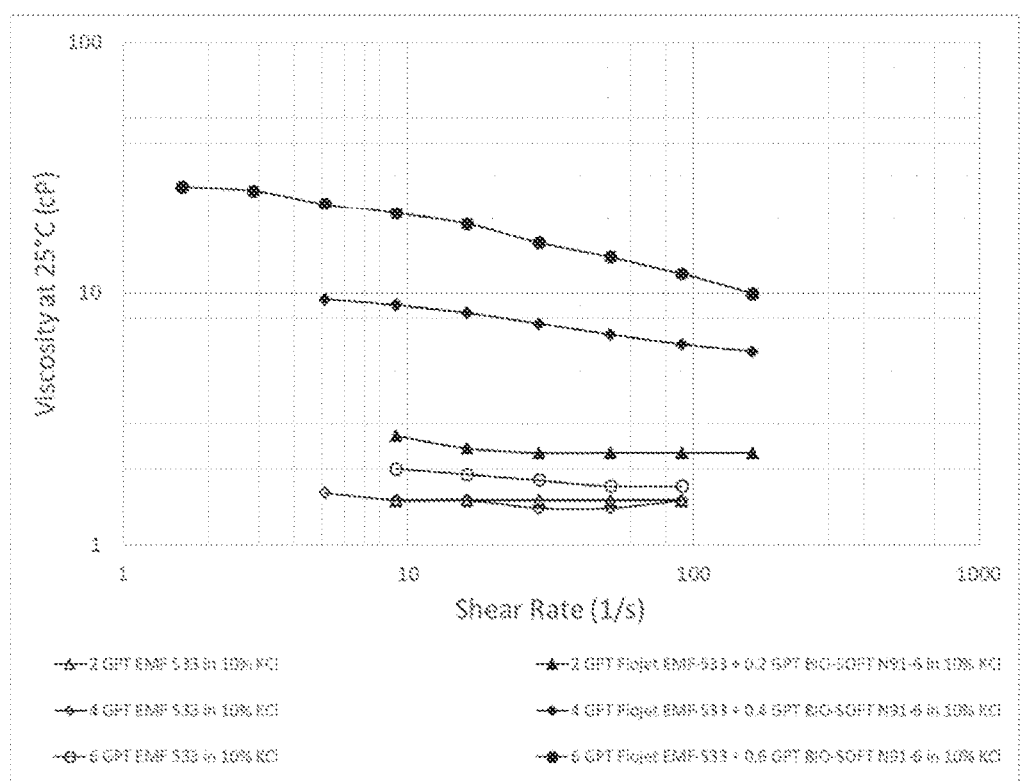
FIG. 2 is a plot of viscosity versus shear rate for FLOJET® EMF-533 in 10% KCl at 2, 4, or 6 gpt and the impact on viscosity of including 10 pph of an ethoxylated alcohol (BIO-SOFT® N91-6).

In a first series of experiments performed in 10 wt. % aqueous KCl, FLOJET® EMF-533 is used at 2, 4, or 6 gpt with no surfactant added. In each case, FIG. 2 shows (open triangles, open circles, open diamonds) undesirably low viscosity resulting from the salt content. However, introducing 10 parts of BIO-SOFT® N91-6 per 100 parts of friction reducer significantly augments viscosity (closed shapes). Without the added surfactant, even the 6 gpt level of friction reducer provides significantly less viscosity than the 2 gpt level of friction reducer with 10 pph of nonionic surfactant.

Example C: Effect of HLB

A series of tallowamine ethoxylates having calculated HLB values of 5, 9, 11, and 15 is used in combination with FLOJET® EMF-533 and 10 wt. % aqueous KCl at 6 gpt. Results of the viscosity versus shear rate experiments appear in FIG. 3. As shown in the figure, tallowamine ethoxylates having calculated HLB values of at least 10 (open triangles, open circles in FIG. 3) when used with the anionic friction reducer provide desirably high viscosities under these conditions, whereas tallowamine ethoxylates having calculated HLB values less than 10 (open diamonds, asterisks in FIG. 3) are unable to augment viscosity with the friction reducer well enough in the high-salinity environment.

FIG. 3 also demonstrates that HLB alone is not determinative of whether a satisfactory increase in viscosity can be achieved at high salinity. MAKON® L64, an EO-PO-EO block copolymer (HLB=15) is a known friction reducer booster, but despite its high HLB, it fails to help the anionic friction reducer to maintain high viscosity in 10% KCl.

Example D: Augmenting Viscosity with Other Chemistries

Using the anionic friction reducer (FLOJET® EMF-533) and 10% KCl, other surfactant classes are evaluated for their ability to quickly build and maintain viscosity with the friction reducer under high salinity. Experiments are performed at 6 gpt with 10 parts of surfactant per 100 parts of FLOJET® EMF-533 (0.6 gpt). FIG. 4 shows that good results can be achieved with MAKON® TSP-16, a tristyrylphenol ethoxylate (HLB=14), NINOL® C-5, a PEG-6 coconut DEA amide (HLB=14.6), and BIO-SOFT® N91-6, a $C_9$-$C_{11}$ alcohol ethoxylate (HLB=12.4). N23 5E 4P, developmental EO/PO alkoxylate, also provides a significant increase in viscosity.

In contrast, MAKON® TD-3, a tridecyl alcohol ethoxylate (HLB=8), shown in FIG. 4 with open circles, is ineffective in helping the friction reducer maintain adequately high viscosity.

Example E: Friction Reduction and Viscosity Increases are Decoupled

Some surfactants can desirably boost viscosity but are subpar performers in boosting friction reduction. This demonstrates that these properties are independent of each other. FIGS. 5A and 5B illustrate this principle. When FLOJET® EMF-533 is combined under stressed conditions for friction reduction (0.25 gpt) in 3.5% marine salt with 10 pph of BIO-SOFT® N1-7 ($C_{11}$ alcohol ethoxylate, HLB=12.9), BIO-SOFT® N91-8 ($C_9$-$C_{11}$ alcohol ethoxylate, HLB=13.9), or TOXIMUL® CA-7.5 (cocamine ethoxylate, HLB=12), there is no measurable improvement in friction reduction when compared with FLOJET® EMF-533 alone (FIG. 5A). As shown in FIG. 5B, however, the same set of surfactants, when combined with 6 gpt FLOJET® EMF-533 at 8 pph (0.48 gpt) surfactant, provide a substantial viscosity increase versus the control experiment with no surfactant. This demonstrates that a surfactant that helps to maintain high viscosity will not necessarily also boost friction reduction.

Example F: Effective Friction Reducers May not Favorably Impact Viscosity

Figure 6A:
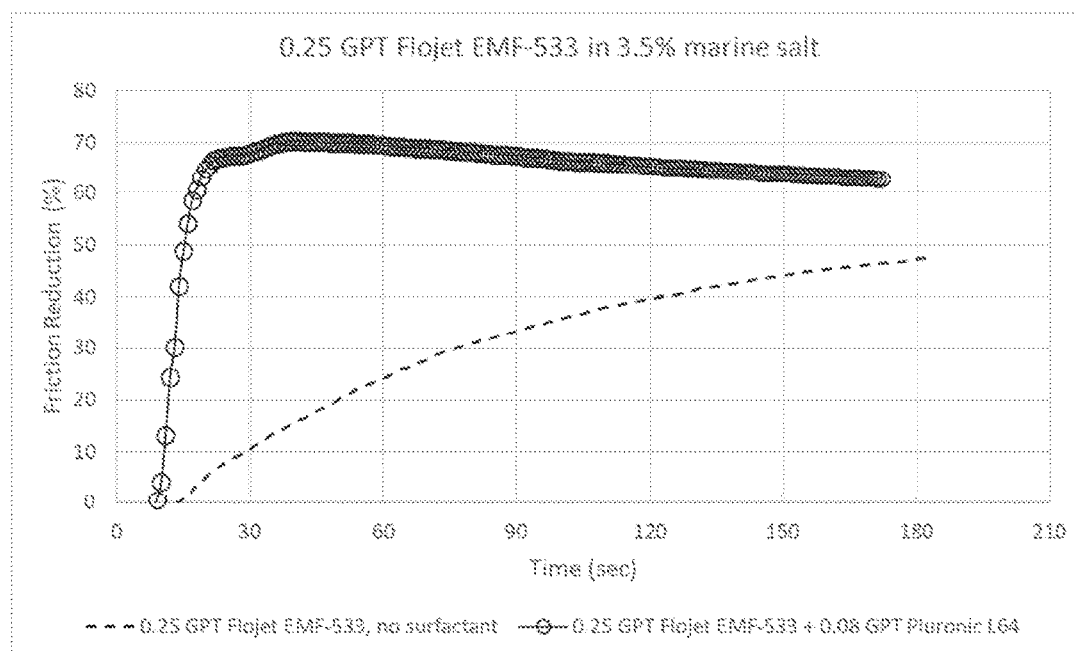
FIGS. 6A and 6B show that although an EO-PO-EO block copolymer (PLURONIC® L64 or MAKON® L64) effectively enhances friction reducer performance in the flow-loop experiment (FIG. 6A), it fails to maintain adequately high viscosity in the presence of 3.5% marine salt (FIG. 6B). In contrast, MAKON® TSP-16, a tristyrylphenol ethoxylate (HLB=13), provides the desired high viscosity under the same conditions (FIG. 6B).
Figure 6B:
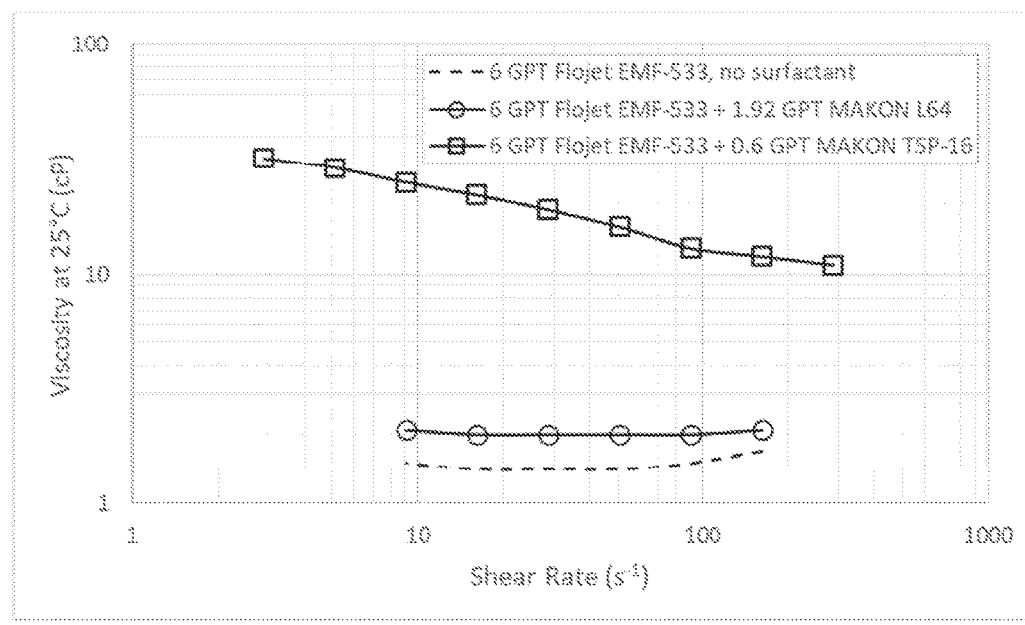

FIG. 6A shows the effectiveness of PLURONIC® L64, an EO-PO-EO block copolymer (product of BASF) in boosting friction reduction in 3.5 wt. % marine salt when combined with 0.25 gpt of FLOJET® EMF-533 at 32 pph (0.08 gpt) surfactant. As shown in FIG. 6B (open circles), MAKON® L64, an EO-PO-EO block copolymer having the same HLB, fails to maintain adequately high viscosity in the presence of 3.5% marine salt when used with 6 gpt FLOJET® EMF-533 at 32 pph (1.92 gpt) surfactant. Together, FIGS. 6A and 6B show that an excellent friction reducer booster may be ineffective in augmenting viscosity of the system under high salinity conditions.

In contrast, MAKON® TSP-16, a tristyrylphenol ethoxylate, provides the desired high viscosity at 10 pph (0.6 gpt), i.e., at much lower surfactant concentration (see FIG. 6B, open squares).

Example G: Combination with a Cationic Friction Reducer

Figure 7:
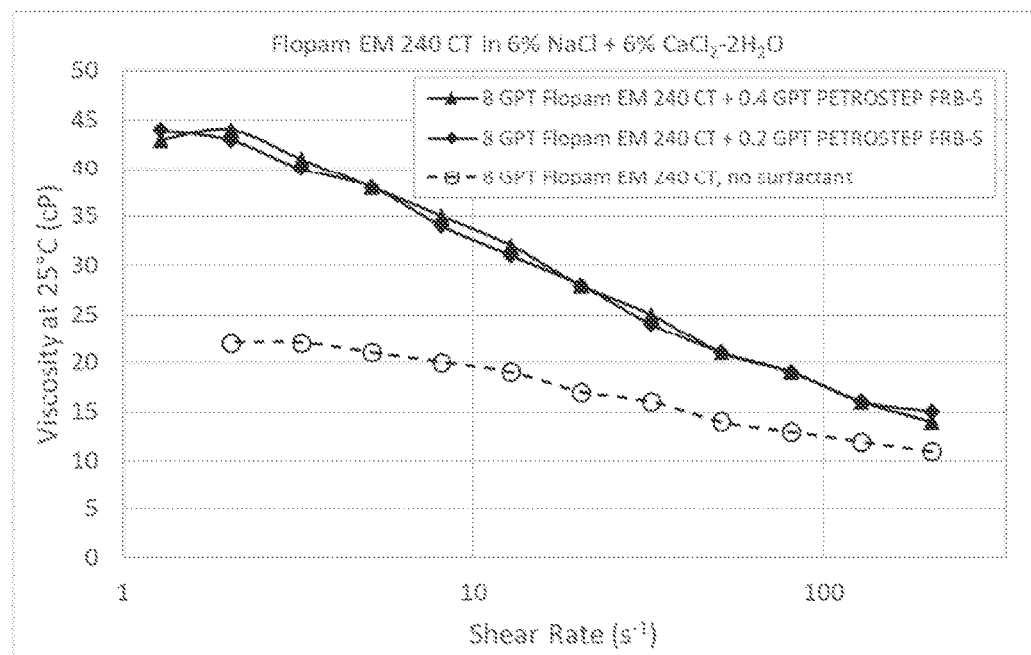
FIG. 7 shows that viscosity with cationic friction reducers under high salinity conditions can be maintained with even low concentrations of PETROSTEP® FRB-5, an alcohol alkoxylate with EO and PO blocks.

Polyacrylamide friction reducers are available in both anionic and cationic forms. When 8 gpt of FLOPAM™ EM 240 CT, a cationic friction reducer, is combined under high salinity with a low concentration (0.4 gpt or 0.2 gpt) of PETROSTEP® FRB-5 (an alcohol alkoxylate with EO and PO blocks), a significant boost in viscosity results (see FIG. 7). This illustrates that cationic friction reducers can benefit from inclusion of the surfactants, and that only a low concentration of the surfactant is needed to deliver a desirable viscosity increase under high salinity conditions.

The preceding examples are only illustrations. The following claims define the scope of the invention.

We claim:

1. A method which comprises recovering hydrocarbons by hydraulic fracturing using a proppant and a fracturing fluid, the fracturing fluid comprising (i) a base water comprising produced water, recycled water, fresh water, or a combination thereof; (ii) an acrylamide polymer emulsion friction reducer; and (iii) a nonionic surfactant having a calculated HLB within the range of 10 to 17;
   wherein the proppant is used at a concentration of 0.25 to 6 pounds per gallon of fracturing fluid;
   wherein the friction reducer is used at a concentration of 2 to 615 gallons per thousand gallons (gpt) of fracturing fluid;
   wherein the nonionic surfactant is used at a concentration of 1 to 20 parts by weight per 100 parts by weight (pph) of friction reducer;
   wherein the nonionic surfactant is selected from the group consisting of:
   (a) aralkylated phenol ethoxylates;
   (b) $C_{12}$-$C_{22}$ amine ethoxylates or $C_{12}$-22 amidoamine ethoxylates;
   (c) alkoxylates of linear or branched $C_8$-$C_{18}$ alcohols, the alkoxylates having 10 to 90 mole % of oxyethylene units and 10 to 90 mole % of oxypropylene units, wherein the mole % values are based on the combined amounts of oxyethylene and oxypropylene units;
   (d) ethoxylated $C_9$-$C_{15}$ alcohols;
   (e) ethoxylated $C_8$-$C_{18}$ amides; and
   (f) alkylphenol ethoxylates having a $C_8$-$C_{16}$ alkyl group and an average of 8 to 25 oxyethylene groups;
   wherein the nonionic surfactant promotes proppant transport by enhancing a viscosity of the fracturing fluid during use when compared with the same fracturing fluid used in an absence of the nonionic surfactant, and wherein the viscosity enhancement of the fracturing fluid is 1.5× to 4.0× at a shear rate of 100 s$^{-1}$.

2. The method of claim 1 wherein the friction reducer is an anionic acrylamide polymer emulsion.

3. The method of claim 1 wherein the friction reducer is a cationic acrylamide polymer emulsion.

4. The method of claim 1 wherein the base water is produced water having a salinity of at least 10,000 ppm TDS.

5. The method of claim 1 wherein the friction reducer and nonionic surfactant are combined on-the-fly with produced water.

6. The method of claim 1 wherein the nonionic surfactant has a calculated HLB within the range of 11 to 15.

7. The method of claim 1 wherein the nonionic surfactant is used in an amount within the range of 2 to 10 pph of friction reducer.

8. The method of claim 1 wherein the nonionic surfactant is a tristyrylphenol ethoxylate having a calculated HLB within the range of 12 to 14.

9. The method of claim 1 wherein the nonionic surfactant is a $C_{12}$-$C_{18}$ amine ethoxylate having a calculated HLB within the range of 11 to 15.

10. The method of claim 9 wherein the amine ethoxylate is a tallowamine ethoxylate having a calculated HLB within the range of 11 to 14.

11. The method of claim 1 wherein the nonionic surfactant is an alkoxylate of a linear or branched $C_{10}$-$C_{16}$ alcohol, the alkoxylates having 25 to 75 mole % of oxyethylene units and 25 to 75 mole % of oxypropylene units.

12. The method of claim 1 wherein the nonionic surfactant is an alkoxylate of a linear or branched $C_{11}$-$C_{13}$ alcohol, the alkoxylates having 40 to 60 mole % of oxyethylene units and 40 to 60 mole % of oxypropylene units.

13. The method of claim 1 wherein the nonionic surfactant is an ethoxylated $C_9$-$C_{11}$ alcohol having a calculated HLB from 11.5 to 12.5.

14. The method of claim 1 wherein the nonionic surfactant is an ethoxylated $C_{10}$-$C_{14}$ amide having a calculated HLB within the range of 13 to 15.

15. The method of claim 1 wherein the nonionic surfactant is an ethoxylated octyl- or nonylphenol having an average of 8 to 15 oxyethylene groups.

16. The method of claim 1 wherein the nonionic surfactant boosts friction reduction when compared with the friction reduction achieved in the absence of the nonionic surfactant.

17. The method of claim 1 wherein the proppant is silica having a mesh size within the range of 10 to 100 mesh.

18. The method of claim 1 wherein the proppant is used at a concentration of 1 to 3 pounds per gallon of fracturing fluid.

* * * * *